United States Patent [19]

Fulger et al.

[11] Patent Number: 4,568,550

[45] Date of Patent: Feb. 4, 1986

[54] PROCESS FOR PREPARING A COOKED EXTRUDED FLOUR-BASED PRODUCT

[75] Inventors: Charles V. Fulger, Millwood; Charles R. Lazarus, Ossining; Wen C. Lou, Yorktown Heights, all of N.Y.; Charles T. Stocker, Augusta, Mich.; Chia-Chi Tu, Dover, Del.

[73] Assignee: General Foods Corporation, White Plains, N.Y.

[21] Appl. No.: 709,980

[22] Filed: Mar. 11, 1985

Related U.S. Application Data

[63] Continuation of Ser. No. 300,083, Sep. 8, 1981, abandoned.

[51] Int. Cl.[4] .............................................. A23D 6/00
[52] U.S. Cl. ...................................... 426/19; 426/498; 426/551
[58] Field of Search ................... 426/19, 498, 549, 551

[56] References Cited

U.S. PATENT DOCUMENTS 3,041,176  6/1962  Baker .................................. 426/498
4,218,480  8/1980  Dyson et al. .......................... 426/19
4,364,941  12/1982  Darley et al. ......................... 426/19

Primary Examiner—Raymond Jones
Assistant Examiner—Elizabeth A. King
Attorney, Agent, or Firm—Joseph T. Harcarik; Thomas R. Savoie; Daniel J. Donovan

[57] ABSTRACT

This invention prepares a fully cooked extruded flour-based product with a texture, aerated structure, cohesiveness, appearance and rehydration characteristics of a fully baked flour-based product by: feeding a flour, a gas forming agent, and water into an extruder in amounts effective to prepare a dough having a moisture content within the range of 20 to 40%; mixing and kneading the flour and water to prepare a homogeneous dough; and extruding the dough while subjecting the dough within the extruder to cooking temperatures within the range of 140° F. to 250° F. (60° C. to 120° C.) while under pressures and low shear conditions and for a period of time effective to set the protein and to partially gelatinize the starch in the flour while maintaining the starch granule integrity.

18 Claims, No Drawings

PROCESS FOR PREPARING A COOKED EXTRUDED FLOUR-BASED PRODUCT

This application is a continuation of application Ser. No. 300,083, filed Sept. 8, 1981, now abandoned.

BACKGROUND OF INVENTION

This invention is concerned with preparing a cooked extruded flour-based product. More particularly with extruding a flour-based dough under conditions which are effective to prepare a product with a texture, cohesiveness, appearance and rehydration characteristics of a fully baked flour-based product.

Flour-based products, that is bread, cereals, pet foods, etc., have been prepared by conventional processes to obtain specific desired textural attributes. Bread and bread particles made therefrom are generally produced by baking bread according to conventional yeast leavening procedures which involve developing dough in a mixer and development trowel, either utilizing the sponge, continuous or straight dough method (e.g. fermenting and degassing), dividing the dough, balling, intermediate proofing, sheeting, panning the dough, and having a final additional pan proofing and then baking at temperatures generally on the order of 350° to 400° F. (175° to 205° C.) wherein additional development of the dough takes place by action of the yeast (oven spring). Thereafter, the bread may be sliced, staled and diced if bread particles, croutons, or crumbs are desired. The conventional baking process results in a desireable spongy, cohesive texture which readily rehydrates upon contact with liquid. Also the baked bread has a set protein matrix wherein the starch granules are substantially swollen and intact giving it desireable textural and mouthfeel attributes. A key limitation of the baking process is that it is basically a time consuming batch cooking process thereby limiting the throughput, as well as being capital and space intensive.

Cereals and pet foods have been processed in continuous cooking-extrusion apparatus, but heretofore obtaining a baked texture, as obtained with baked bread, in such a cooking-extrusion processes has not been observed. The puffed cereal and pet food extrusion processes generally involve high temperature, pressure and shear with the extrudate being puffed by the release of steam upon exiting the extruder, resulting in a high degree of protein denaturization disrupting the protein matrix, as well as a high degree of rupturing of the starch granules. The result of this cooking-extrusion process is a plastic extrudate which generally has a low density, and is mushy, sticky and falls apart when contacted with liquid. While extruder mixing or kneading devices have been used in the industry, as well as extruder-mixing apparatus which inject gas, as in U.S. Pat. No. 4,218,480, the use of an extruder-cooker under proper conditions to prepare a fully cooked flour based product with the texture, rehydration characteristics, cohesiveness and appearance characteristics and aerated structure of a fully baked flour-based product has not been observed.

Further, the baking and cooking-extrusion processes have been limited in the amounts of heat sensitive ingredients, shear sensitive ingredients or food particles which can be incorporated while still maintaining the functionality and integrity of the ingredients and/or obtaining the desired cell structure and resultant textural attributes in the resultant product.

Thus, it is a feature of this invention to prepare a fully cooked, flour-based product with the textural attributes of a fully baked flour-based product.

It is a further feature of this invention to provide a continuous cooking-extrusion process which fully cooks a four-based dough, but without substantial disruption of the protein matrix and starch granules of the dough.

It is a further feature of this invention to provide low temperature, gentle processing of a flour-based product which will enable the incorporation of ingredients which are sensitive to high shear and high temperatures.

SUMMARY OF THE INVENTION

Basically, the features of this invention are carried out by: feeding a flour and water into an extruder in amounts effective to prepare a dough having a moisture content within the range of 20 to 40%; mixing and kneading the flour and water to prepare a homogeneous dough; and extruding the dough while subjecting the dough within the extruder to cooking temperatures within the range of 140° F. to 250° F. (60° C. to 120° C.) while under pressures and effective shear conditions and for a period of time effective to set the protein and to partially gelatinize the starch in the flour while maintaining the starch granule integrity and resulting in a fully cooked extruded flour-based product with a texture, cohesiveness, appearance and rehydration characteristics and aerated structure of a fermented, fully baked flour-based product. Gas is incorporating into the dough to provide an aerated cell structure. An additional embodiment involves fermenting a portion or all of the flour and water in the dough prior to feeding it into the extruder.

DETAILED DESCRIPTION OF THE INVENTION

This invention provides a continuous cooking extrusion process which prepares a fully cooked, extruded, flour-based product with the texture (spongy), aerated structure, cohesiveness upon Ccontact with liquid (rehydration characteristics), and protein matrix and partially gelatinized starch of a fermented and fully baked flour-based product. This process is most particularly adapted to producing bread crumbs or croutons which have the characteristics of bread pieces prepared from a fully baked bread. Within the cooking-extrusion process of this invention variations in the processing conditions and/or formula can be made to produce extrudates with widely varying textures, e.g. chewy crust of bread or soft spongy center of bread.

The first step involves feeding a flour and water into an extruder in amounts effective to prepare a dough having a moisture content within the range of 20 to 40%, preferably 25 to 35% by weight of the dough. An alternate embodiment involves premixing and kneading the dough, preferably up to 70% of the flour and up to 100% of the water. Additionally, the premixed flour and water can contain a leavening yeast and can be fermented prior to feeding into the extruder. The yeast acts more as a dough texture modifier and flavoring agent rather than for gas production as gas is substantially lost during extrusion. The gas generated during the fermentation may be collected for subsequent reintroduction or injection into the dough during the cooking-extrusion process.

The flour based dough can contain common bread, cereal, pet food or other ingredients. For example, a typical bread dough formulation can comprise: flour 100%; salt, 0 to 3%; sugar, 0 to 15%; yeast, 0 to 2.5%; shortening, 0 to 8%; milk or milk substitute, 0 to 8%; color, 0 to 0.5% and a mold inhibitor (e.g. calcium propionate) 0 to 0.4%, all percents being by weight of the flour being 100%. Additionally a starch complexing agent or dough conditioner such as sodium steroyl-2-lactylate, or glyceryl monostearate has been found desireable to improve the texture of the dough and the resultant extruded product.

Gas is necessarily incorporated into the dough to obtain an aerated cell structure. Without the gas incorporation an aerated cell structure is not obtained, since the extrusion conditions (e.g. temperature, shear etc.) are significantly milder than the extrusion conditions employed in cereal extrusion where steam puffing provides an aerated product. In one preferred embodiment, gas is incorporated into the dough by adding a gas forming agent to the dough which will release a gas during extrusion to develop the desired aerated structure. Preferred gas forming agents include sodium bicarbonate, ammonium carbonate, solid carbon dioxide as well as carbonates of other metals. These gas forming agents exclude fermentable gas generators, such as yeast. Another preferred embodiment involves injecting a gas such as carbon dioxide or nitrogen, into the dough during the extrusion process. This beneficially results in an open spongy cell structure as is observed in a fully baked, yeast leavened, flour-based product.

One unique feature of the process of this invention is that it enables heat sensitive, shear sensitive materials, food particles or other materials which could not be effectively incorporated in a conventional bread baking or cooking-extrusion process to be added to the dough formulation. This would include substantial levels of ingredients such as soy flour, potato flour, inlays such as fruits and nuts, vitamins, enzymes, flavors, as well as materials such as meat, gums, vegetables, and proteins (e.g. gluten), grains, malted flour, cellulose, fiber etc. In general, any pet food, cereal or bread ingredients may be added to the flour-based dough of this invention. By flour-based what is meant is that flour makes up at least 50% by weight of the dry ingredients. The relatively low temperatures and low shear at which the dough is processed will enable the heat sensitive and shear sensitive materials to survive the cooking-extrusion process of this invention.

The flour, water and other optional ingredients are then mixed and kneaded to prepare a homogeneous dough. This mixing and kneading process can be carried out in a first stage or section of the extruder which has temperatures below the cooking or gelatinization range of the ingredients, i.e. below about 130° F. (55° C.). Alternatively, the mixing can be carried out in a batch process or continuous dough mixer and then fed into the extruder. Within the mixing step, kneading of the dough takes place which aids in the formation of a desireable texture in the resultant extruded product.

The dough is then subjected within the extruder to cooking temperatures within the range of 140° F. to 250° F. (60° C. to 120° C.), preferably 160° F. to 205° F. (70° C. to 95° C.). These temperatures are critical to setting the protein (i.e. gluten) matrix and to partially gelatinize the starch, but without fully denaturing and disrupting the protein matrix and without substantially rupturing the starch granules (avoiding a plastic flow). At this temperature in the extruder the dough is also subjected to pressure and shear conditions, as well as for a period of time effective to set the protein and partially gelatinize the starch in a flour while maintaining the starch granules substantially intact (avoiding a plastic flow) and without substantially disrupting the protein matrix. Under these conditions, the protein hydrates and bonds into a set protein matrix while the starch remains intact, providing the desired aerated cell structure which results in the texture, cohesiveness and rehydration characteristics as is observed in a fully baked, flour-based product. The effective period of time is dependent upon the variables temperature, pressure, shear etc., but generally will be within the range of 15 to 45 seconds. By partially gelatinized, what is meant is that all the starch granules have begun to gelatinize and swell, but without necessarily being fully gelatinized, and what is meant by substantially intact is that at least a majority of the starch granules are intact and not ruptured.

During the extrusion-cooking process, the pressure and shear conditions are also controlled to provide the desired protein matrix and starch integrity. In general, the head pressure of the extruder is within the range of 25 to 1200 psig (1 to 85 Kg per cm$^2$), preferably 300 to 1000 psig (20 to 70 Kg per cm$^2$). When the dough is premixed and fermented the head pressure of the extruder is preferably within the range of 300 to 600 psig (20 to 42 Kg per cm$^2$), while when the dry flour and water are fed directly into the extruder the head pressure of the extruder is preferably within the range of 600 to 1000 psig (42 to 70 Kg per cm$^2$). The higher pressures for the dry flour feed are employed to fully hydrate, knead and soften the dough. A substantial portion of the head pressure is caused by the incorporation of gas into the dough.

The shear conditions within the extruder are also critically controlled to provide effective shear. This means selecting the proper type of screw design within the extruder, such as a conveyance-forming type screw, in order to maintain the starch granule integrity and the protein matrix. An additional factor in controlling shear is to employ a screw which provides little constriction in the diameter, as well as little thread increase during the path through the extruder (low pitch, low increase in thread and low decrease in the depth of the flight). By employing the proper low shear screw within the extruder, the work done on the dough is not translated into shear and temperature, as is evidenced by the low rate at which the granules are ruptured and by the protein matrix being maintained. A single or twin screw extruder may be employed, with the single screw extruder being preferred as it provides lower shear.

Upon exiting the extruder the temperature of the extrudate as well as the conditions are preferably controlled to provide a proper structure with a desired amount of puffing of the extrudate. This can involve cooling the cooked dough to a temperature within the range of 120° to 135° F. (50° C. to 60° C.), alternatively extruding into a vacuum, a partial vacuum, or hot air. Further, upon exiting the extruder if particles or crouton shaped pieces are desired, the extruded product can be sliced. Before or after slicing or dicing of the extruded product, the product may be toasted or fried to develop a desired color and/or crust and may dried, for example, to less than 10% moisture by weight, basically for storage stability. Additionally, the extrudate may be coated, dipped or sprayed with other ingredients (e.g. fat, sugar, flavor, amino acid, color, etc.).

EXAMPLE I

A bread formula consisting of patent flour at 75 parts by weight; cake flour at 25 parts by weight; non fat dry milk at 3 parts by weight; vegetable shortening at 1 part by weight; sugar at 4 parts by weight; salt at 1 part by weight; emulsifier (glyceryl-monostearate) at 0.8 parts by weight; water at 57–60 parts by weight; and active dry yeast at 1 part by weight was mixed, kneaded and allowed to ferment for 45–60 min. at 28°–32° C. Following fermentation the dough was placed in an open-screw feeder machine. A second mix consisting of patent flour at 75 parts by weight; cake flour at 25 parts by weight; sugar at 4 parts by weight; salt at 1 part by weight; non fat dry milk at 3 parts by weight; and baking powder at 6 parts by weight (sodium bicarbonate, calcium acid phosphate and sodium aluminum sulphate) was placed in a second feeder apparatus. The feed rate for the open-screw feeder was set at 156 lb/hr. (71 Kg/hr.) while the dry flour feeder had a setting of 108 lb/hr (49 Kg/hr.). Additional water was fed into the extruder at the rate of 12 lb./hr (5.4 Kg/hr.). The resultant dough blend had moisture content of about 30%.

In order to extrude the fermented dough/dry flour blend, a single screw extruder of the type designed by Wenger Corporation, Sabetha, Kans., was employed. The approximate operating conditions for the Wenger Model X-20 extruder were as follows: RPM 275; head pressure (PSI) 300 to 400 (21 to 28 Kg per cm$^2$); extruder barrel temperatures were: #1 55° F. (13° C.), #2 250° F. (120° C.), #3 250° F. (120° C.), #4 250° F. (120° C.), #5 225° F. (107° C.). The configuration of the screw consisted of conveyance screws for barrels #1, #2, #3, and #4 in that they had a constant depth of 0.4 inches (10 mm) and a constant pitch of 1.9 inches (48 mm), with the screw within barrel #5 at the die end having a depth of 0.2 (5 mm) inches and a pitch of 1.9 inches (48 mm) with a taper (the diameter decreasing) from 3.3 to 2.5 inches (84 to 64 mm) through a length of 4.5 inches (114 mm). The total screw configuration contributing minimal or low shear to the dough, with the screw section closest to the die (in barrel #5) being tappered (decreasing in diameter) to efficiently extrude through the die orifice. Steam locks were placed between screw sections 2 and 3, 3 and 4, and between 4 and 5. The die consisted of one 3/16 inch (5 mm) diameter opening the total residence time of the dough through zones #2, #3, #4 and #5 was about 25 seconds.

The extrusion process consisted of placing the feeders, which have the dough and dry flours in them, over the inlet opening of the extruder and by adjusting the machine to the conditions described above. An excellent bread-like product with a spongy, cohesive texture was obtained. Within the bread product the starch was partially gelatinized while retaining its granules substantially intact, and without substantially disrupting the protein matrix. This product was air dried (@ 40° C.), diced, and toasted (170° C.) to obtain the desired bread crumb. The bread crumb had excellent water absorption and cohesiveness, as well as the density and texture of conventionally prepared bread croutons. When seasoning, butter and hot water were added to the dry crumb, an excellent ready to eat bread stuffing was obtained, in which the crumbs retained their identity and did not become mushy and sticky.

EXAMPLE II

A bread formula consisting of patent flour at 75 parts by weight; cake flour at 25 parts by weight; non fat dry milk at 3 parts by weight; vegetable shortening at 1 part by weight; sugar at 4 parts by weight; salt at 1 part by weight; emulsifier (glyceryl-monostearate) at 0.8 parts by weight; and water at 57–59 parts by weight was mixed and kneaded at ambient temperature for 9 minutes in a Hobart mixer. No yeast was added to this dough. The dough was allowed to relax for at least 30 min. after kneading and prior to extrusion. The dough was placed in an open-screw feeder machine. A second mix consisting of patent flour at 75 parts by weight; cake flour at 25 parts by weight; sugar at 4 parts by weight; salt at 1 part by weight; non fat dry milk at 3 parts by weight; and baking powder at 6 parts by weight (sodium bicarbonate, calcium acid phosphate and sodium aluminum sulphate) was placed in a second feeder apparatus. The feed rate for the open-screw feeder was set at 156 lb/hr. (71 Kg/hr.) while the dry flour feeder had a setting of 108 lb/hr (49 Kg/hr.). Additional water was fed into the extruder at the rate of 12 lb./hr. (5.4 Kg/hr.). The resultant dough blend had a moisture content of about 30%.

In order to extrude the dough/dry flour blend, a single screw extruder of the type designed by Wenger Corporation, Sabetha, Kans., was employed. The approximate operating conditions for the Wenger Model X-20 extruder were as follows: RPM 275; head pressure (PSI) 800 (56 Kg per cm$^2$); extruder barrel temperates were: #1 55° F. (130° C.), #2 250° F. (120° C.), #3 250° F. (120° C.), #4 250° F. (120° C.), #5 225° F. (107° C.). The configuration of the screw consisted of conveyance screws for barrels #1, #2, #3, and #4 in that they had a constant depth of 0.4 inches (10 mm) and a constant pitch of 1.9 inches (48 mm), with the screw within barrel #5 at the die end having a depth of 0.2 inches (5 mm) and a pitch of 1.9 inches (48 mm), with a taper (the diameter decreasing) from 3.3 to 2.5 inches (84 to 64 mm) through a length of 4.5 inches (114 mm). The total screw configuration contributing minimal or low shear to the dough, with the screw section closest to the die (in barrel #5) being tappered (decreasing in diameter) to efficiently extrude through the die orifice. Steam locks were placed between screws sections 2 and 3, 3 and 4, and between 4 and 5. The die consisted of one 3/16 inch (5 mm) diameter opening. The residence time of the dough in zones #2, #3, #4 and #5 was about 25 seconds.

The extrusion process consisted of placing the feeders, which have the dough and dry flours in them, over the inlet opening of the extruder and by adjusting the machine to the conditions described above. An excellent bread-like product with a spongy, cohesive texture was obtained. Within the bread product the starch was partially gelatinized while retaining its granules substantially intact, and without substantially disrupting the protein matrix. This product was air dried (@ 40° C.), diced and toasted (170° C.) to obtain the desired bread crumb. This bread crumb had excellent water absorption and cohesiveness, as well as the density and texture of conventionally prepared bread croutons. When seasoning, butter and hot water are added to the dry crumb, an excellent ready to eat bread stuffing was obtained, in which the crumbs maintained their identity and did not become mushy and sticky.

EXAMPLE III

A bread formula consisting of patent flour at 75 parts by weight; cake flour at 25 parts by weight; non fat dry milk at 3 parts by weight; vegetable shortening at 0.4 part by weight; sugar at 4 parts by weight; salt at 1 part by weight; emulsifier (glyceryl-monostearate) at 0.3 parts by weight; and baking powder at 3.5 parts by weight (sodium bicarbonate, calcium acid phosphate and sodium aluminum sulphate) was placed in a feeder apparatus. The feed rate had a setting of 216 lb/hr (98 Kg/hr.) while the water was fed into the extruder at the rate of 39 lb/hr. (18 Kg/hr.). The resultant flour blend had moisture content of about 24%.

In order to extrude the flour blend, a single screw extruder of the type designed by Wenger Corporation, Sabetha, Kans., was employed. The approximate operating conditions for the Wenger Model X-20 extruder were as follows: RPM 250; head pressure (PSI) 600 to 900 (42 to 63 Kg per cm$^2$); extruder barrel temperatures were: #1 55° F. (13° C.), #2 90° F. (32° C.), #3 175° F. (79° C.), #4 175° F. (79° C.), #5 130° F. (54° C.). The configuration of the screw consisted of conveyance screws for barrels #1, #2, #3, and #4 in that they had a constant depth of 0.4 inches (10 mm) and a constant pitch of 1.9 inches (48 mm), with the screw within barrel #5 at the die end having a depth of 0.2 inches (5 mm) and a pitch of 1.9 inches (48 mm) with a taper (the diameter decreasing) from 3.3 to 2.5 inches (84 to 64 mm) through a length of 4.5 inches (114 mm). The total screw configuration contributing minimal or low shear to the dough, with the screw section closest to the die (in barrel #5) being tapered (decreasing in diameter) to efficiently extrude through the die orifice. Steam locks were placed between screws sections 2 and 3, 3 and 4, and between 4 and 5. The die consisted of one 3/16 inch (5 mm) diameter opening. The residence time of the dough in zones #3, #4, and #5 was about 17 sec.

The extrusion process consisted of placing the dry flour in a feeder apparatus and by adjusting the machine to the conditions described above an excellent bread-like product with a spongy, cohesive texture was obtained. Within the bread product the starch was partially gelatinized while retaining its granules substantially intact, and without substantially disrupting the protein matrix. This product was air dried (@ 40° C.) to about 15% moisture, diced and toasted (170° C.) to obtain the desired bread crumb. The bread crumb had excellent water absorption and cohesiveness, as well as the density and texture of conventionally prepared bread croutons. When seasoning, butter and hot water were added to the dry crumb, an excellent ready to eat bread stuffing was obtained, in which the crumbs maintained their identity and did not become mushy and sticky.

EXAMPLE IV

A bread formula consisting of patent flour at 75 parts by weight; cake flour at 25 parts by weight; non fat dry milk at 3 parts by weight; vegetable shortening at 1 part by weight; sugar at 4 parts by weight; salt at 1 part by weight; water at 57 parts by weight; and active dry yeast at 1 part by weight are mixed; kneaded and fermented for 45–60 min. at 28°–32° C. Following fermentation, the dough is placed in an open-screw feeder machine. A second mix consisting of patent flour at 75 parts by weight; cake flour at 25 parts by weight; non fat dry milk at 3 parts by weight; sugar 4 parts by weight and salt at 1 part by weight is placed in a second feeder apparatus. The feed rate for the open-screw feeder is set at 225 lb/hr while the dry flour feeder is set at 110 lb/hr. The moisture content of the resultant dough blend is about 33%.

In order to extrude the fermented dough/dry flour blend, a twin-screw extruder is employed. The operating conditions are approximately as follows: RPM 80; head pressure 25 to 100 psig (1 to 7 Kg per cm$^2$); six of the 10 barrels have a temperature profile of no heat with the other barrels having temperatures of about: #4 150° F. (65° C.) #3 175° F. (80° C.) #2 175° F. (80° C.); and #1 150° F. (65° C.) (closest to die). The screw configurations are conveyance type screws with a constant pitch and constant depth for barrels #1 through #4 (#1 closest to die); barrel #5 additionally has a kneading block. Gas ($CO_2$) is injected into the dough between barrels #2 and #3 at a pressure of about 200 psig (14 Kg per cm$^2$). The die consists of two 6 mm diameter openings. The residence time in barrels #4 through #1 is about 35 seconds.

The extrusion process consists of placing the feeders, which have the dough and dry flours in them, over the inlet opening of the extruder and adjusting the machine to the conditions described above. A bread-like product with a cellular structure and a spongy, cohesive texture is obtained.

What is claimed is:

1. A continuous process for preparing a cooked extruded edible flour-based product comprising:
   (a) feeding a flour, a gas forming agent, and water into an extruder in amounts effective to prepare a dough having a moisture content of 20 to 40% by weight said gas forming agent being sufficient to release a gas during a subsequent extrusion step, thereby providing an aerated cell structure in the resultant extruded product;
   (b) mixing and kneading the flour, gas forming agent and water to prepare a homogeneous dough; and
   (c) extruding the dough while subjecting the dough within the extruder to cooking temperatures within the range of 140° F. to 250° F. under effective pressure and effective shear conditions and for a time effected to set the protein and partially gelatinize the starch in the flour while maintaining the starch granules substantially intact whereby a fully cooked extruded flour-based produce is obtained without and additional baking step, the product having the texture, aerated structure, cohesiveness, appearance and rehydration characteristics of a fully baked flour-based product.

2. Process of claim 1 wherein the moisture content of the dough is 25 to 35%.

3. Process of claim 2 wherein the flour and the water are premixed and kneaded prior to feeding into the extruder.

4. Process of claim 3 wherein the premixed flour and water additionally contains yeast and is fermented prior to cooking in the extruder.

5. Process of claims 1, 2 or 4 further comprising toasting the extruded product.

6. Process of claims 1, 2 or 4 further comprising dicing the extruded product.

7. Process of claims 1, 2 or 4 further comprising drying the extruded product to a moisture content of less than 10% by weight.

8. Process of claim 1 wherein the dough is subjected to pressures within the range of 25 to 1200 psig.

9. Process of claim 8 wherein the dough is subjected to temperatures within the range of 160° to 205° F.

10. Process of claim 9 wherein the bread exiting the extruder has a temperature within the range of 120° to 135° F.

11. Process of claim 9 wherein the dough is subjected to the cooking temperatures for 15 to 45 seconds.

12. Process of claim 3 wherein the dough further comprises non-fat dry milk, shortening, sucrose, salt and baking powder.

13. Process of claim 12 wherein the dough further comprises a starch complexing agent.

14. Process of claim 1 wherein the dough further comprises additional ingredients selected from the group consisting of flavor, vitamin, fruit, nut, meats and grain.

15. Process of claim 1 wherein the dough further comprises additional ingredients selected from the group consisting of gum, vegetable, protein, enzyme, acid, and fiber.

16. Process of claim 1 wherein a bread dough is prepared further comprising ingredients selected from the group consisting of sugar, fat, milk, a starch complexing agent and mold inhibitor.

17. Process of claim 1 wherein the extrusion is carried out in a single screw extruder.

18. A continuous process for preparing a cook extruded edible flour-based product comprising:
 (a) feeding flour and a gas forming agent into an extruder said gas forming agent being sufficient to release a gas during a subsequent extrusion step, thereby providing an aerated cell structure in the resultant extruded product;
 (b) feeding water and additional flour into the extruder in amounts effective to prepare a dough having a moisture content of 20 to 40% by weight;
 (c) mixing and kneading the flour, gas forming agent and water to prepare a homogeneous dough; and
 (d) extruding the dough while subjecting the dough within the extruder to cooking temperatures within the range of 140° F. to 250° F. under effective pressure and effective shear conditions and for a time effected to set the protein and partially gelatinize the starch in the flour while maintaining the starch granules substantially intact whereby a fully cooked extruded flour-based product is obtained without and additional baking step, the product having the texture, aerated structure, cohesiveness, appearance and rehydration characteristics of a fully baked flour-based product.

* * * * *